(12) United States Patent
Yan et al.

(10) Patent No.: US 9,007,949 B2
(45) Date of Patent: Apr. 14, 2015

(54) METHOD AND APPARATUS FOR SEARCHING CARRIER FREQUENCIES

(71) Applicant: Fujitsu Limited, Kawasaki-shi, Kanagawa (JP)

(72) Inventors: Zhi Yan, Beijing (CN); Gang Sun, Beijing (CN); Xin Wang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 150 days.

(21) Appl. No.: 13/900,184

(22) Filed: May 22, 2013

(65) Prior Publication Data

US 2013/0315082 A1 Nov. 28, 2013

(30) Foreign Application Priority Data

May 24, 2012 (CN) .......................... 2012 1 0165410

(51) Int. Cl.
*H04W 4/00* (2009.01)
*H04W 24/00* (2009.01)
*H04J 11/00* (2006.01)
*H04W 48/16* (2009.01)

(52) U.S. Cl.
CPC ........... *H04W 24/00* (2013.01); *H04J 11/0069* (2013.01); *H04W 48/16* (2013.01)

(58) Field of Classification Search
None
See application file for complete search history.

(56) References Cited

U.S. PATENT DOCUMENTS

2011/0075745 A1* 3/2011 Kleider et al. ................ 375/260
2011/0122930 A1* 5/2011 Al-Naffouri et al. ......... 375/219

* cited by examiner

*Primary Examiner* — John Blanton
(74) *Attorney, Agent, or Firm* — Arent Fox LLP (57) ABSTRACT

A method and apparatus for searching carrier frequencies (CFs) including determining all CFs to be measured within a frequency band according to a predetermined frequency interval; selecting part of the CFs as Sampling Measurement CFs (SMCFs) according to a predetermined band search step, and for each of the SMCFs, calculating initial peak to average ratio (PAR) of the SMCFs; weighting the initial PAR of each of the SMCFs by using initial PARs of SMCFs left and right neighboring each of the SMCFs, to obtain a determined PAR of each of the SMCFs; ordering the determined PARs of all the SMCFs, and selecting, in a descending order of the determined PARs, a predetermined number of SMCFs and frequencies to be measured left and right neighboring the selected SMCFs as a search result.

9 Claims, 5 Drawing Sheets

METHOD AND APPARATUS FOR SEARCHING CARRIER FREQUENCIES

CROSS-REFERENCE TO RELATED APPLICATIONS

This application is based upon and claims the benefit of priority of Chinese Patent Application No. 201210165410.2, filed May 24, 2012, the disclosure of the prior application of which is hereby incorporated in its entirety by reference.

TECHNICAL FIELD

The present invention relates to the field of communications, and in particular to a method and apparatus for searching carrier frequencies.

BACKGROUND ART

In an LTE-A (long-term evolution advanced) system, the number of available carrier frequencies becomes more and more, and it becomes more and more important to design a method of low complexity and high efficiency for searching carrier frequencies to satisfy the LTE-A system.

Figure 1:
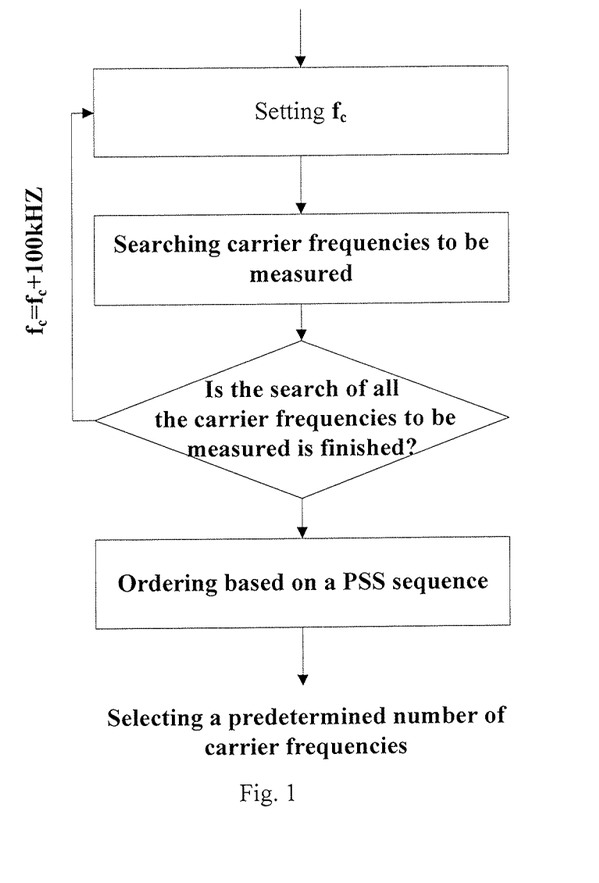
FIG. 1 is a flowchart of an existing method for searching carrier frequencies.

A conventional algorithm for searching carrier frequencies is carried out by primary synchronization signal (PSS) of LTE (long-term evolution) system. On the whole available band, PSS search is performed with a carrier frequency interval of 100 kHZ, so as to calculate a corresponding frequency peak to average ratio, thereby selecting one or more frequencies as candidates for subsequent cell search. The detailed flow is shown in FIG. 1.

Figure 2:
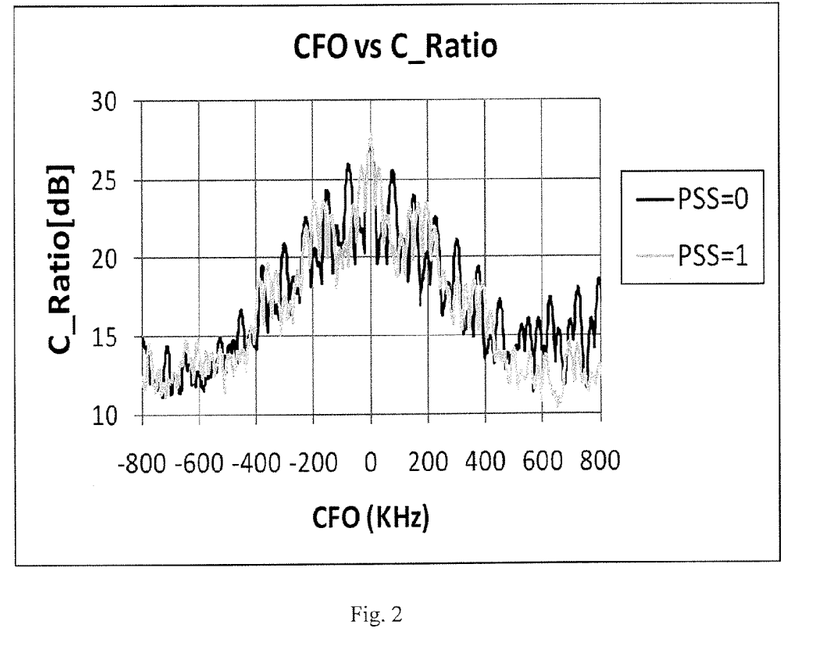
FIG. 2 is a schematic diagram of comparison of CFO and C_ratio.

However, in the implementation of the present invention, the inventors found that in an LTE-A system, the number of the available carrier frequencies is very large. For example, for BAND1 (2110 MHz-2170 MHz), in a conventional method for searching carrier frequencies, search is performed with a carrier frequency interval of 100 kHZ, and 600 carrier frequencies need to be searched, which takes a very long time. On the other hand, PSS is very sensitive to carrier frequency offset (CFO), and when the CFO is in a range of 400 kHZ, the peak value related to the PSS association is still large, and the obtained C_ratio is very large, which has direct effect on the performance and correct detection rate of the carrier frequencies search. FIG. 2 is a schematic diagram showing a C_ratio between CFO and PSS association taking two PSSs as an example. Furthermore, due to channel fading, the channel condition for different carrier frequencies are different, it is very possible that the search in correct carrier frequencies is influenced by the channel fading, and its C_ratio is lower than that of other carrier frequencies, resulting in failure of the detection.

It should be noted that the above introduction to the background art is given for the clear and complete description of the technical solution of the present invention and for the understanding by those skilled in the art. The above technical solutions should not be deemed as being known to those skilled in the art for having been described in the background art of the present invention.

SUMMARY OF THE INVENTION

The method and apparatus for searching carrier frequencies of the embodiments of the present invention are provided for solving the above problem.

According to a first aspect of the embodiments of the present invention, there is provided a method for searching carrier frequencies, comprising:

determining all the carrier frequencies to be measured within a frequency band according to a predetermined frequency interval;

selecting a part of the carrier frequencies to be measured as sampling measurement carrier frequencies according to a predetermined band search step, and for each of the sampling measurement carrier frequencies, calculating an initial peak to average ratio of the sampling measurement carrier frequency;

weighting the initial peak to average ratio of each of the sampling measurement carrier frequencies by using initial peak to average ratios of sampling measurement carrier frequencies left and right neighboring the each of the sampling measurement carrier frequencies, so as to obtain a determined peak to average ratio of the each of the sampling measurement carrier frequencies; and ordering the determined peak to average ratios of all the sampling measurement carrier frequencies, and selecting, in a descending order of the determined peak to average ratios, a predetermined number of sampling measurement carrier frequencies and frequencies to be measured left and right neighboring the selected sampling measurement carrier frequencies as a search result.

According to a second aspect of the embodiments of the present invention, there is provided an apparatus for searching carrier frequencies, comprising:

a determining unit configured to determine all the carrier frequencies to be measured within a frequency band according to a predetermined frequency interval;

a calculating unit configured to select a part of the carrier frequencies to be measured as sampling measurement carrier frequencies according to a predetermined band search step, and for each of the sampling measurement carrier frequencies, calculate an initial peak to average ratio of the sampling measurement carrier frequency;

a weighting unit configured to weight the initial peak to average ratio of each of the sampling measurement carrier frequencies by using initial peak to average ratios of sampling measurement carrier frequencies left and right neighboring the each of the sampling measurement carrier frequencies, so as to obtain a determined peak to average ratio of the each of the sampling measurement carrier frequencies; and a selecting unit configured to order the determined peak to average ratios of all the sampling measurement carrier frequencies, and select, in a descending order of the determined peak to average ratios, a predetermined number of sampling measurement carrier frequencies and frequencies to be measured left and right neighboring the selected sampling measurement carrier frequencies as a search result.

According to a third aspect of the embodiments of the present invention, there is provided an user equipment (UE), comprising the apparatus for searching carrier frequencies as described above.

The advantage of the present invention exists in that the precision of carrier frequencies search is improved and the complexity is lowered with the method and apparatus.

Particular embodiments of the present invention will be described in detail below with reference to the following description and attached drawings and the manners of using the principle of the present invention are pointed out. It should be understood that the implementation of the present invention is not limited thereto in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings.

DETAILED DESCRIPTION OF THE INVENTION

The foregoing and other features of the embodiments of the present invention will become apparent with reference to the attached drawings and the following description. These embodiments are illustrative only, and are not intended to limit the present invention. For the easy understanding of the principle and embodiments of the present invention, the embodiments of the present invention shall be described taking an method for searching carrier frequencies in LTE-A system as an example. However, it should be understood that the embodiments of the present invention are not limited thereto, and are applicable to any other systems related to searching carrier frequencies.

Embodiment 1

Figure 3:
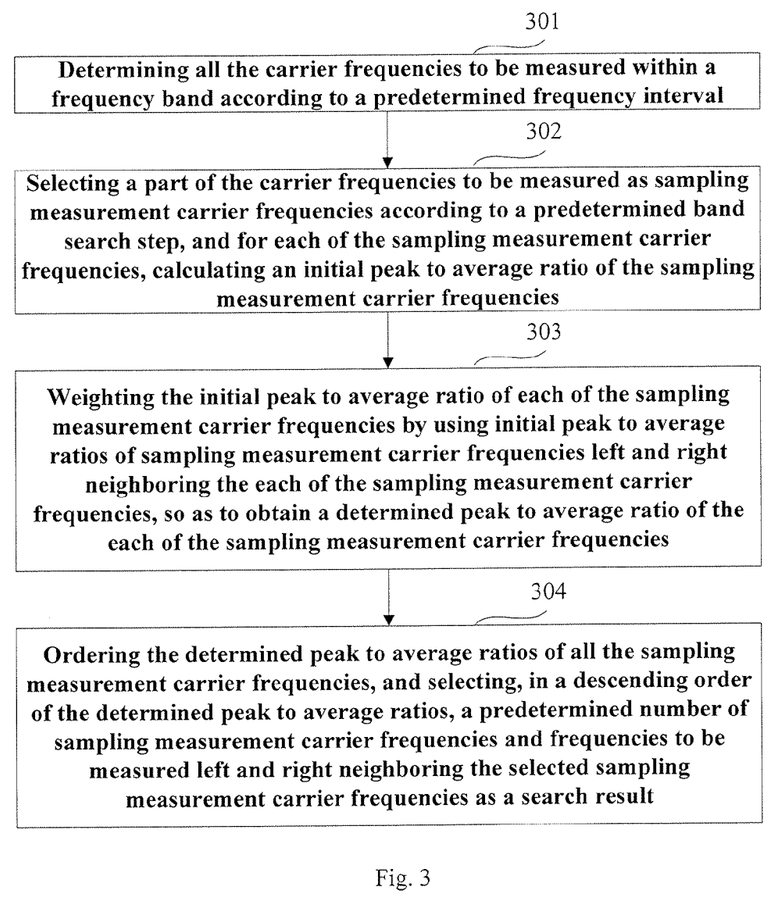
FIG. 3 is a flowchart of the method for searching carrier frequencies of an embodiment of the present invention.

An embodiment of the present invention provides a method for searching carrier frequencies. FIG. 3 is a flowchart of the method. Referring to FIG. 3, the method comprises:

step 301: determining all the carrier frequencies to be measured within a frequency band according to a predetermined frequency interval;

wherein, the predetermined frequency interval may be 100 kHZ, and frequency band may be BAND 1, that is, 2110 MHZ-2170 MHZ; however, this embodiment is not limited thereto; namely, in step 301, one carrier frequency to be measured is determined in the range of 2110 MHZ-2170 MHZ at an interval of 100 kHZ, thereby determining all the carrier frequencies to be measured within the range of 2110 MHZ-2170 MHZ;

step 302: selecting a part of the carrier frequencies to be measured as sampling measurement carrier frequencies according to a predetermined band search step, and for each of the sampling measurement carrier frequencies, calculating an initial peak to average ratio of the sampling measurement carrier frequencies;

wherein, the predetermined band search step is a natural number greater than or equal to 1, if the predetermined band search step is n, then n>=1; in step 302, the predetermined band search step is taken as the interval, and a part of the carrier frequencies to be measured determined in step 301 are selected as sampling measurement carrier frequencies; that is, one carrier frequency to be measured is selected at an interval of n as a sampling measurement carrier frequency;

and wherein, the method for calculating initial peak to average ratio of the sampling measurement carrier frequencies may be carried out in an existing manner; this embodiment is not limited thereto, and description shall be given below by way of examples;

step 303: weighting the initial peak to average ratio of each of the sampling measurement carrier frequencies by using initial peak to average ratios of sampling measurement carrier frequencies left and right neighboring the each of the sampling measurement carrier frequencies, so as to obtain a determined peak to average ratio of the each of the sampling measurement carrier frequencies;

wherein, for each of the sampling measurement carrier frequencies, in step 303, initial peak to average ratios of sampling measurement carrier frequencies left and right neighboring the each of the sampling measurement carrier frequencies are used to weight the initial peak to average ratio of each of the sampling measurement carrier frequencies, so as to obtain a determined peak to average ratio of the sampling measurement carrier frequency;

for example, for sampling measurement carrier frequency $f_c$, the left neighboring sampling measurement carrier frequency is $f_c+100(n-1)$, . . . , $f_c+100$ [kHz], and the right neighboring sampling measurement carrier frequency is $f_c-100(n-1)$, . . . , $f_c-100$ [kHz]; where, n is the predetermined band search step, and n>=1;

in particular, if n=2, the sampling measurement carrier frequencies left and right neighboring the sampling measurement carrier frequency $f_c$ are $f_c+100(2-1)=f_c+100$ and $f_c-100(2-1)=f_c-100$, respectively; if n=3, the sampling measurement carrier frequencies left and right neighboring the sampling measurement carrier frequency $f_c$ are $f_c+100(3-1)=f_c+200$, $f_c+100(2-1)=f_c+100$ and $f_c-100(3-1)=f_c-200$, $f_c-100(2-1)=f_c-100$, respectively; if n=4, the sampling measurement carrier frequencies left and right neighboring the sampling measurement carrier frequency f are $f_c+100(4-1)=f_c+300$, $f_c+100(3-1)=f_c+200$, $f_c+100(2-1)=f_c+100$ and $f_c-100(4-1)=f_c-300$, $f_c-100(3-1)=f_c-200$, $f_c-100(2-1)=f_c-100$, respectively, and so on, which shall not be described any further;

in step 303, the initial peak to average ratio of the sampling measurement carrier frequency $f_c$ is weighted by using the initial peak to average ratio of sampling measurement carrier frequency $f_c+100(n-1)$, . . . , $+100$ [kHz] and the initial peak to average ratio of sampling measurement carrier frequency $f_c-100(n-1)$, . . . , $f_c-100$ [kHz], so as to obtain a determined peak to average ratio of the sampling measurement carrier frequency $f_c$;

wherein, there is no limit to the weighting method in this embodiment, which may be carried out by any existing weighting method, and description shall be given below by way of examples;

step 304: ordering the determined peak to average ratios of all the sampling measurement carrier frequencies, and selecting, in a descending order of the determined peak to average ratios, a predetermined number of sampling measurement carrier frequencies and frequencies to be measured left and right neighboring the selected sampling measurement carrier frequencies as a search result;

wherein, determined peak to average ratios of all the sampling measurement carrier frequencies may be obtained in step 303, the determined peak to average ratios of all the sampling measurement carrier frequencies are ordered in step 304, and a predetermined number of sampling measurement carrier frequencies and frequencies to be measured left and right neighboring the selected sampling measurement carrier frequencies are selected as a search result;

for example, if the sampling measurement carrier frequency $f_c$ is selected according to a determined peak to average ratio, the carrier frequencies $f_c+100(n-1)$ and $f_c-100(n-1)$ left and right neighboring $f_c$ are selected as a search result.

The search precision of carrier frequencies is improved and the complexity is lowered with the method of this embodiment.

Figure 4:
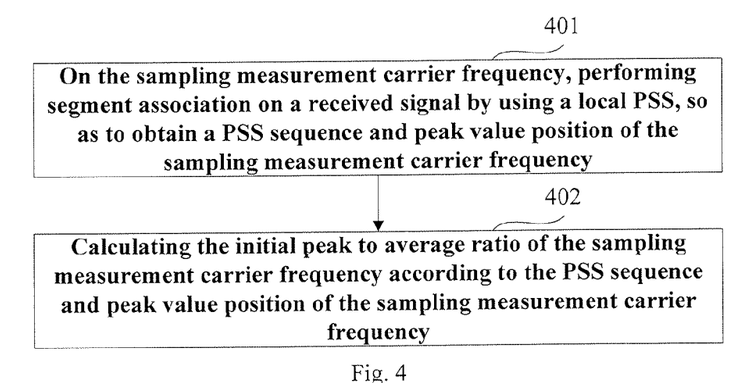
FIG. 4 is a flowchart of calculating an initial peak to average ratio of the sampling measurement carrier frequencies of an embodiment of the present invention.

In an embodiment of step 302, an initial peak to average ratio of each sampling measurement carrier frequency is calculated by using the method shown in FIG. 4. Referring to FIG. 4, the method comprises:

step 401: on the sampling measurement carrier frequency, performing segment association on a received signal by using a local PSS, so as to obtain a PSS sequence and peak value position of the sampling measurement carrier frequency;

in an embodiment, the segment association on the received signal is performed according to the formula as follows:

$$C(n_{ZC}, k) = \left(\frac{1}{(N_{FFT}-2)/3} \sum_{l=0}^{(N_{FFT}-2)/3-1} r(k+l)p^*(n_{ZC}, l)\right)^*$$

$$\left(\frac{1}{(N_{FFT}-2)/3} \sum_{l=(N_{FFT}-2)/3}^{2(N_{FFT}-2)/3-1} r(k+l)p^*(n_{ZC}, l)\right) +$$

$$\left(\frac{1}{(N_{FFT}-2)/3} \sum_{l=(N_{FFT}-2)/3}^{2(N_{FFT}-2)/3-1} r(k+l)p^*(n_{ZC}, l)\right)^*$$

$$\left(\frac{1}{(N_{FFT}-2)/3} \sum_{l=2(N_{FFT}-2)/3}^{(N_{FFT}-2)-1} r(k+l)p^*(n_{ZC}, l)\right)$$

where, r(k) is a sampling point of a received signal in time domain, $p(n_{ZC}, l)$ is a local PSS, $n_{ZC}$ is a serial number of the PSS, and $N_{FFT}$ is the point number of a Fast Fourier Transform (FFT);

and the PSS sequence and peak value position of the sampling measurement carrier frequency are expressed as:

$$(n_{ZC\_max}, k_{max}) = \underset{(n_{ZC}, k)}{\mathrm{argmax}} |C(n_{ZC}, k)|^2;$$

where, $n_{ZC}$ is a serial number of the PSS, $n_{ZC\_max}$ is a selected maximum serial number of the PSS, and $k_{max}$ is a peak value position;

step 402: calculating the initial peak to average ratio of the sampling measurement carrier frequency according to the PSS sequence and peak value position of the sampling measurement carrier frequency;

wherein, the initial peak to average ratio of the sampling measurement carrier frequency is determined by using the PSS to which $n_{ZC\_max}$ corresponds and the peak value position $k_{max}$;

for example, the initial peak to average ratio of the sampling measurement carrier frequency may be determined according to the formula as follows:

$$C_{ratio}^{fc} = \frac{\frac{1}{2W_{mask}+1} \sum_{k=k_{max}-W_{mask}}^{k_{max}+W_{mask}} |C(n_{ZC\_max}, k)|^2}{\frac{1}{T_{SCH}T_{slot}-(2W_{mask}+1)} \left(\sum_{k=0}^{k_{max}-W_{mask}-1} |C(n_{ZC\_max}, k)|^2 + \sum_{k=k_{max}+W_{mask}+1}^{T_{SCH}T_{slot}-1} |C(n_{ZC\_max}, k)|^2\right)};$$

where, $W_{mask}$ is the point number of a peak value window, referred to as a mask point number, and $T_{SCH}T_{slot}$ is sampling points number of 5 ms search time.

The initial peak to average ratio of each of the sampling measurement carrier frequencies may be determined by using the method shown in FIG. 4.

In an embodiment of step 303, for each of the sampling measurement carrier frequencies, the determined peak to average ratio of the sampling measurement carrier frequency is obtained by weighting the initial peak to average ratio of the sampling measurement carrier frequency by using initial peak to average ratios of sampling measurement carrier frequencies left and right neighboring the sampling measurement carrier frequency, according to the formula as follows:

$$C_{ratio}^{f_c'} = \sum_{i=-M}^{M} \alpha_i C_{ratio}^{fc+i};$$

where, the weighting coefficient is $$\alpha_i = \frac{M+1-|i|}{M+1}.$$

The determined peak to average ratio of each of the sampling measurement carrier frequencies may be determined by using the above method of weighting.

The above weighting method is illustrative only, and the embodiment of the present invention is not limited thereto. For example, the weighting coefficient may be linearly weighting, that is, the weighting factor $a_i$ is equal to 1 ($a_i=1$).

For clarity and easy understanding of the method of this embodiment, the method is described with reference to the overall search flow shown in FIG. 5.

Figure 5:
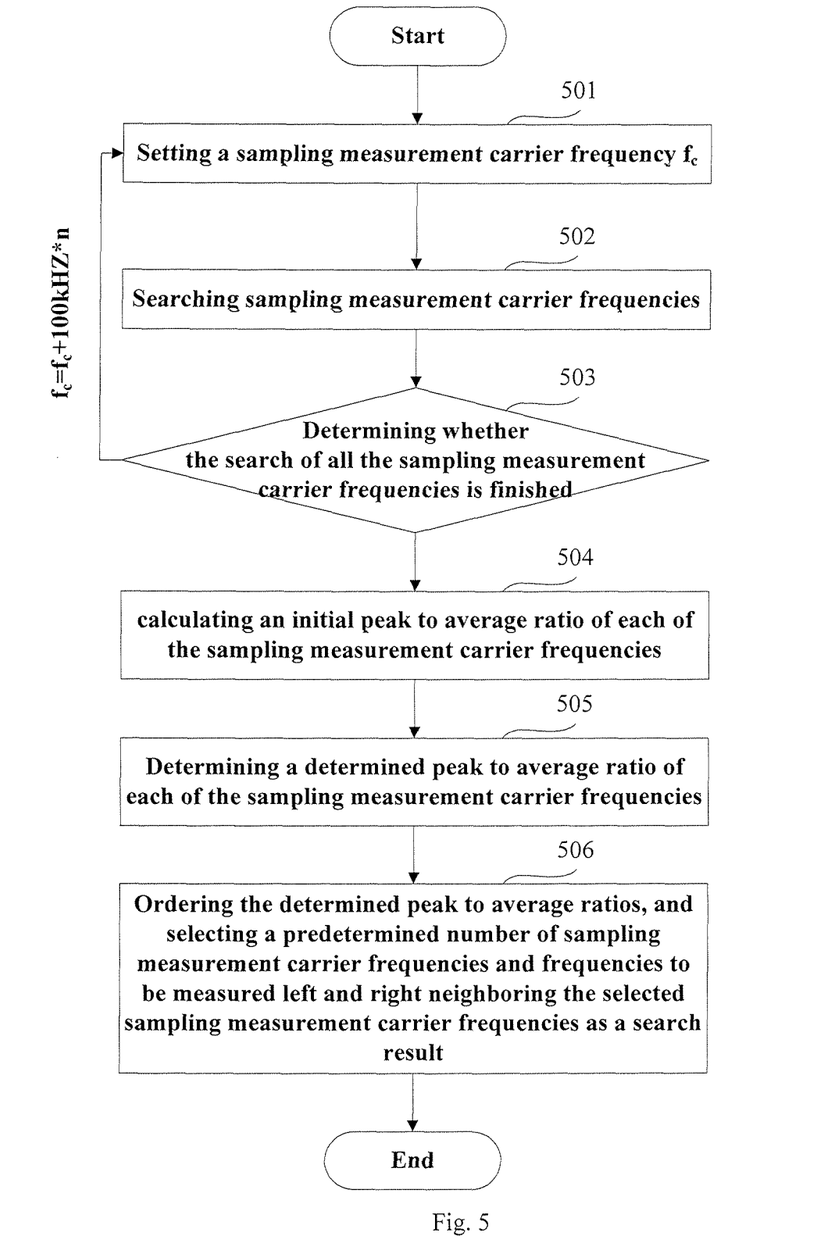
FIG. 5 is a flowchart of overall search of the method for searching carrier frequencies of an embodiment of the present invention.

Referring to FIG. 5, the flow comprises the following steps:

step 501: setting a sampling measurement carrier frequency $f_c$;

step 502: searching sampling measurement carrier frequencies;

step 503: determining whether the search of all the sampling measurement carrier frequencies within a predetermined frequency band is finished, executing step 504 if the result is positive, and determining the next sampling measurement carrier frequency according to a predetermined band search step n if the result is negative and turning back to step 501;

step 504: calculating an initial peak to average ratio of each of the sampling measurement carrier frequencies (segment association);

step 505: determining a determined peak to average ratio of each of the sampling measurement carrier frequencies (weighting); and step 506: ordering the determined peak to average ratios, and selecting a predetermined number of sampling measurement carrier frequencies and frequencies to be measured left and right neighboring the selected sampling measurement carrier frequencies as a search result.

With the method of this embodiment, band search step of carrier frequencies search is increased and the complexity is lowered. The peak to average ratio (the initial peak to average ratio) of each of the sampling measurement carrier frequencies (frequencies to be measured after the band search step is increased) is weighted, thereby improving the search precision.

An embodiment of the present invention further provides an apparatus for searching carrier frequencies as described in Embodiment 2 below. As the principle of the apparatus for solving problems is similar to that of the method of Embodiment 1, the implementation of the method may be referred to for the implementation of the apparatus, and the repeated parts shall not be described any further.

Embodiment 2

Figure 6:
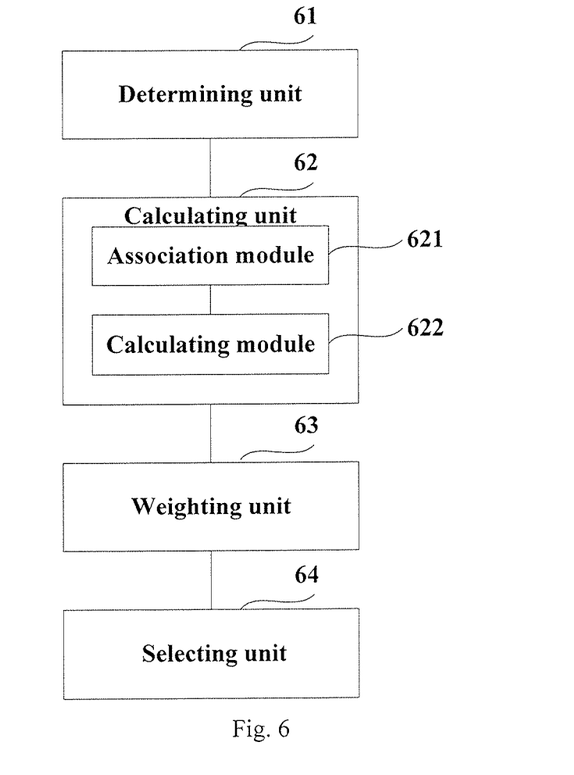
FIG. 6 is a schematic diagram of the composition of the apparatus for searching carrier frequencies of an embodiment of the present invention.

An embodiment of the present invention further provides an apparatus for searching carrier frequencies. FIG. 6 is a schematic diagram of the composition of the apparatus. Referring to FIG. 6, the apparatus comprises:

a determining unit 61 configured to determine all the carrier frequencies to be measured within a frequency band according to a predetermined frequency interval;

a calculating unit 62 configured to select a part of the carrier frequencies to be measured as sampling measurement carrier frequencies according to a predetermined band search step, and for each of the sampling measurement carrier frequencies, calculate an initial peak to average ratio of the sampling measurement carrier frequency;

a weighting unit 63 configured to weight the initial peak to average ratio of each of the sampling measurement carrier frequencies by using initial peak to average ratios of sampling measurement carrier frequencies left and right neighboring the each of the sampling measurement carrier frequencies, so as to obtain a determined peak to average ratio of the each of the sampling measurement carrier frequencies; and a selecting unit 64 configured to order the determined peak to average ratios of all the sampling measurement carrier frequencies, and select, in a descending order of the determined peak to average ratios, a predetermined number of sampling measurement carrier frequencies and carrier frequencies to be measured left and right neighboring the selected sampling measurement carrier frequencies as a search result.

In an embodiment, the calculating unit 62 may comprises:

an association module 621 configured to, for each of the sampling measurement carrier frequencies, use a local PPS to perform segment association on the received signal, so as to obtain a PSS sequence and peak value position of the sampling measurement carrier frequency; and a calculating module 622 configured to calculate an initial peak to average ratio of the sampling measurement carrier frequency according to the PSS sequence and peak value position of the sampling measurement carrier frequency.

Wherein, the association module 621 may perform the segment association on the received signal according to the formula below:

$$C(n_{ZC}, k) = \left(\frac{1}{(N_{FFT}-2)/3} \sum_{l=0}^{(N_{FFT}-2)/3-1} r(k+l)p^*(n_{ZC}, l)\right)^*$$

$$\left(\frac{1}{(N_{FFT}-2)/3} \sum_{l=(N_{FFT}-2)/3}^{2(N_{FFT}-2)/3-1} r(k+l)p^*(n_{ZC}, l)\right) +$$

$$\left(\frac{1}{(N_{FFT}-2)/3} \sum_{l=(N_{FFT}-2)/3}^{2(N_{FFT}-2)/3-1} r(k+l)p^*(n_{ZC}, l)\right)^*$$

$$\left(\frac{1}{(N_{FFT}-2)/3} \sum_{l=2(N_{FFT}-2)/3}^{(N_{FFT}-2)-1} r(k+l)p^*(n_{ZC}, l)\right)$$

and the PSS sequence and peak value position of the sampling measurement carrier frequency hence obtained are expressed as:

$$(n_{ZC\_max}, k_{max}) = \underset{(n_{ZC}, k)}{\operatorname{argmax}} |C(n_{ZC}, k)|^2;$$

where, the meanings of the parameters are as described above, which are omitted herein.

Wherein the calculating module 622 may calculate the initial peak to average ratio of the sampling measurement carrier frequency according to the formula as follows:

$$C_{ratio}^{fc} = \frac{\frac{1}{2W_{mask}+1} \sum_{k=k_{max}-W_{mask}}^{k_{max}+W_{mask}} |C(n_{ZC\_max}, k)|^2}{\frac{1}{T_{SCH}T_{slot}-(2W_{mask}+1)} \left(\sum_{k=0}^{k_{max}-W_{mask}-1} |C(n_{ZC\_max}, k)|^2 + \sum_{k=k_{max}+W_{mask}+1}^{T_{SCH}T_{slot}-1} |C(n_{ZC\_max}, k)|^2\right)};$$

where, the meanings of the parameters are as described above, which are omitted herein.

In an embodiment, for each of the sampling measurement carrier frequencies, the weighting unit 63 may weight the initial peak to average ratio of the sampling measurement carrier frequency by using initial peak to average ratios of sampling measurement carrier frequencies left and right neighboring the sampling measurement carrier frequency according to the formula as follows, so as to obtain the determined peak to average ratio of the sampling measurement carrier frequency:

$$C_{ratio}^{fc'} = \sum_{i=-M}^{M} \alpha_i C_{ratio}^{fc+i};$$

where, the weighting coefficient is $$\alpha_i = \frac{M+1-|i|}{M+1};$$

where, the meanings of the parameters are as described above, which are omitted herein.

In the above embodiment, the predetermined frequency interval may be 100 kHZ, and the predetermined band search step may be n>=1.

When the sampling measurement carrier frequency is $f_c$, frequencies to be measured left and the right neighboring the sampling measurement carrier frequency are $f_c+100(n-1), \ldots, f_c+100$ [kHz] and $f_c-100(n-1), \ldots, f_c-100$ [kHz], respectively; where, n>=1. For example, if n=2, frequencies to be measured left and right neighboring the sampling measurement carrier frequency $f_c$ are $f_c+100(2-1)=f_c+100$ and $f_c-100(2-1)=f_c-100$, respectively; if n=3, frequencies to be measured left and right neighboring the sampling measurement carrier frequency $f_c$ are $f_c+100(3-1)=f_c+200$, $f_c+100(2-1)=f_c+100$ and $f_c-100(3-1)=f_c-200$, $f_c-100(2-1)=f_c-100$, respectively; if n=4, frequencies to be measured left and right neighboring the sampling measurement carrier frequency $f_c$ are $f_c+100(4-1)=f_c+300$, $f_c+100(3-1)=f_c+200$, $f_c+100(2-1)=f_c+100$ and $f_c-100(4-1)=f_c-300$, $f_c-100(3-1)=f_c-200$, $f_c-100(2-1)=f_c-100$, respectively.

With the apparatus of this embodiment, band search step of carrier frequencies search is increased and the complexity is lowered. The peak to average ratio (the initial peak to average ratio) of each of the sampling measurement carrier frequencies (frequencies to be measured after the band search step is increased) is weighted, thereby improving the search precision.

Embodiment 3

Figure 7:
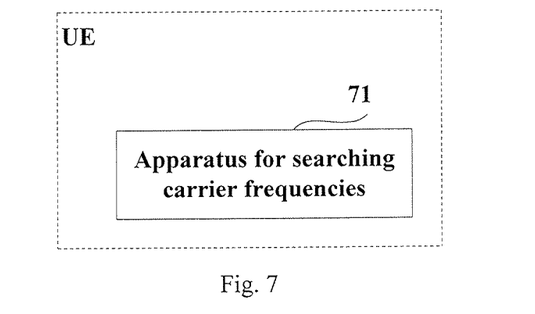
FIG. 7 is a schematic diagram of the composition of the UE of an embodiment of the present invention.

An embodiment of the present invention further provides an user equipment (UE). FIG. 7 shows a schematic diagram of the composition of the UE. Referring to FIG. 7, in addition to the original compositions and functions, the UE further comprises an apparatus 71 for searching carrier frequencies.

In this embodiment, the apparatus 71 for searching carrier frequencies may be carried out by the apparatus for searching carrier frequencies of Embodiment 2 of the present invention, and the contents of which are incorporated herein, which shall not be described any further.

With the UE of this embodiment, in searching carrier frequencies, band search step of carrier frequencies search is increased and the complexity is lowered. The peak to average ratio (the initial peak to average ratio) of each of the sampling measurement carrier frequencies (frequencies to be measured after the band search step is increased) is weighted, thereby improving the search precision.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. A method for searching carrier frequencies, comprising:
determining all the carrier frequencies to be measured within a frequency band according to a predetermined frequency interval;
selecting a part of the carrier frequencies to be measured as sampling measurement carrier frequencies according to a predetermined band search step, and for each of the sampling measurement carrier frequencies, calculating an initial peak to average ratio of the sampling measurement carrier frequencies;
weighting the initial peak to average ratio of each of the sampling measurement carrier frequencies by using initial peak to average ratios of sampling measurement carrier frequencies left and right neighboring the each of the sampling measurement carrier frequencies, so as to obtain a determined peak to average ratio of the each of the sampling measurement carrier frequencies; and
ordering the determined peak to average ratios of all the sampling measurement carrier frequencies, and selecting, in a descending order of the determined peak to average ratios, a predetermined number of sampling measurement carrier frequencies and frequencies to be measured left and right neighboring the selected sampling measurement carrier frequencies as a search result.

2. The method according to claim 1, wherein for each of the sampling measurement carrier frequencies, the step of calculating an initial peak to average ratio of the sampling measurement carrier frequency comprises:
on the sampling measurement carrier frequency, performing segment association on a received signal by using a local Primary Synchronization Signal (PSS), so as to obtain a PSS sequence and peak value position of the sampling measurement carrier frequency; and
calculating the initial peak to average ratio of the sampling measurement carrier frequency according to the PSS sequence and peak value position of the sampling measurement carrier frequency.

3. The method according to claim 2, wherein the segment association on the received signal is performed according to the formula as follows:

$$C(n_{ZC}, k) = \left(\frac{1}{(N_{FFT}-2)/3} \sum_{l=0}^{(N_{FFT}-2)/3-1} r(k+l)p^*(n_{ZC}, l)\right)^*$$
$$\left(\frac{1}{(N_{FFT}-2)/3} \sum_{l=(N_{FFT}-2)/3}^{2(N_{FFT}-2)/3-1} r(k+l)p^*(n_{ZC}, l)\right)$$

and $$+\left(\frac{1}{(N_{FFT}-2)/3} \sum_{l=(N_{FFT}-2)/3}^{2(N_{FFT}-2)/3-1} r(k+l)p^*(n_{ZC}, l)\right)^*$$
$$\left(\frac{1}{(N_{FFT}-2)/3} \sum_{l=2(N_{FFT}-2)/3}^{(N_{FFT}-2)-1} r(k+l)p^*(n_{ZC}, l)\right)$$

the PSS sequence and peak value position of the sampling measurement carrier frequency are expressed as:

$$(n_{ZC\_max}, k_{max}) = \underset{(n_{ZC}, k)}{\operatorname{argmax}} |C(n_{ZC}, k)|^2;$$

where, r(k) is a sampling point of a received signal in time domain, $p(n_{ZC},1)$ is a local PSS, $n_{ZC}$ is a serial number of the PSS, and $N_{FFT}$ is the point number of a FFT.

4. The method according to claim 2, wherein the initial peak to average ratio of the sampling measurement carrier frequency is calculated according to the formula as follows:

$$C_{ratio}^{fc} = \frac{\frac{1}{2W_{mask}+1}\sum_{k=k_{max}-W_{mask}}^{k_{max}+W_{mask}}|C(n_{ZC\_max},k)|^2}{\frac{1}{T_{SCH}T_{slot}-(2W_{mask}+1)}\left(\sum_{k=0}^{k_{max}-W_{mask}-1}|C(n_{ZC\_max},k)|^2 + \sum_{k=k_{max}+W_{mask}+1}^{T_{SCH}T_{slot}-1}|C(n_{ZC\_max},k)|^2\right)};$$

where, $W_{mask}$ is the point number of a peak value window, and $T_{SCH}T_{slot}$ is the number of sampling points of 5 ms of search time.

5. The method according to claim 1, wherein for each of the sampling measurement carrier frequencies, the determined peak to average ratio of the sampling measurement carrier frequency is obtained by weighting the initial peak to average ratio of the sampling measurement carrier frequency by using initial peak to average ratios of the sampling measurement carrier frequencies left and right neighboring the sampling measurement carrier frequency, according to the formula as follows:

$$C_{ratio}^{fc'} = \sum_{i=-M}^{M} \alpha_i C_{ratio}^{fc+i};$$

where, the weighting coefficient is $$\alpha_i = 1$$

or $$\alpha_i = \frac{M+1-|i|}{M+1},$$

M is the number of the left and right neighboring carrier frequencies.

6. The method according to claim 1, wherein the predetermined frequency interval is 100 kHz, and the predetermined band search step is n>=1.

7. The method according to claim 6, wherein when the sampling measurement carrier frequency is $f^c$, the carrier frequencies to be measured left and right neighboring the sampling measurement carrier frequency are $f_c+100(n-1), \ldots, f_c+100$ [kHz] and $f_c-100(n-1), \ldots, f_c-100$ [kHz], respectively; where, n>=1.

8. The method according to claim 7, wherein when the sampling measurement carrier frequency is $f_c$, if n=2, the carrier frequencies to be measured left and right neighboring the sampling measurement carrier frequency are $f_c+100(2-)=f_c+100$ and $f_c-100(2-1)=f_c-100$, respectively;

if n=3, the carrier frequencies to be measured left and right neighboring the sampling measurement carrier frequency are $f_c+100(3-1)=f_c+200$, $f_c+100(2-1)=f_c+100$ and $f_c-100(3-1)=f_c-200$, $f_c-100(2-1)=f_c-100$, respectively; and if n=4, the carrier frequencies to be measured left and right neighboring the sampling measurement carrier frequency are $f_c+100(4-1)=f_c+300$, $f_c+100(3-1)=f_c+200$, $f_c+100(2-1)=f_c+100$ and $f_c-100(4-1)=f_c-300$, $f_c-100(3-1)=f_c-200$, $f_c-100(2-1)=f_c-100$, respectively.

9. An apparatus for searching carrier frequencies, comprising:

a processor configured to perform the functions of:

determining all the carrier frequencies to be measured within a frequency band according to a predetermined frequency interval;

selecting a part of the carrier frequencies to be measured as sampling measurement carrier frequencies according to a predetermined band search step, and for each of the sampling measurement carrier frequencies, calculating an initial peak to average ratio of the sampling measurement carrier frequency;

weighting the initial peak to average ratio of each of the sampling measurement carrier frequencies by using initial peak to average ratios of sampling measurement carrier frequencies left and right neighboring the each of the sampling measurement carrier frequencies, so as to obtain a determined peak to average ratio of the each of the sampling measurement carrier frequencies; and ordering the determined peak to average ratios of all the sampling measurement carrier frequencies, and selecting, in a descending order of the determined peak to average ratios, a predetermined number of sampling measurement carrier frequencies and frequencies to be measured left and right neighboring the selected sampling measurement carrier frequencies as a search result.

\* \* \* \* \*